(12) United States Patent
Kamiya et al.

(10) Patent No.: US 7,619,575 B2
(45) Date of Patent: Nov. 17, 2009

(54) METALLICALLY GROSS LAYER DECORATIVE MOLDED ARTICLE FOR USE IN THE BEAM PATH OF A RADAR DEVICE

(75) Inventors: Hideo Kamiya, Nagoya (JP); Itsuo Kamiya, Toyota (JP); Hiroki Tsuge, Aichi (JP); Tetsuya Fujii, Aichi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 11/385,799

(22) Filed: Mar. 22, 2006

(65) Prior Publication Data
US 2006/0216442 A1    Sep. 28, 2006

(30) Foreign Application Priority Data
Mar. 25, 2005    (JP) .............................. 2005-088782

(51) Int. Cl.
*H01Q 1/32* (2006.01)
*H01Q 1/42* (2006.01)

(52) U.S. Cl. ................. 343/713; 342/1; 342/4; 343/711; 343/872

(58) Field of Classification Search ................. 343/872
See application file for complete search history.

(56) References Cited

U.S. PATENT DOCUMENTS

| | | | |
|---|---|---|---|
| 3,396,400 A | 8/1968 | Kelly et al. | |
| 4,835,061 A * | 5/1989 | Ohta et al. | ................. 428/469 |
| 5,017,738 A | 5/1991 | Tsuji et al. | |
| 5,059,580 A | 10/1991 | Shibata et al. | |
| 5,129,323 A | 7/1992 | Park | |
| 6,184,842 B1 | 2/2001 | Leinweber et al. | |
| 6,235,399 B1 * | 5/2001 | Sugimoto et al. | ............ 428/458 |
| 6,328,358 B1 * | 12/2001 | Berweiler | .................... 293/115 |
| 6,767,755 B2 | 7/2004 | Yamanaka et al. | |
| 7,059,665 B2 * | 6/2006 | Murai et al. | .............. 296/181.2 |
| 7,226,187 B2 | 6/2007 | Yamazaki et al. | |
| 7,256,746 B2 | 8/2007 | Kamiya et al. | |
| 7,282,444 B2 | 10/2007 | Tanida et al. | |

(Continued)

FOREIGN PATENT DOCUMENTS

CN    1579841    2/2005

(Continued)

OTHER PUBLICATIONS

Extended European Search Report of Jul. 20, 2006.

(Continued)

*Primary Examiner*—Trinh V Dinh
(74) *Attorney, Agent, or Firm*—Finnegan, Henderson, Farabow, Garrett & Dunner, LLP

(57) ABSTRACT

A metallically gross layer decorative molded article for use in the beam path of a radar device has a luxurious metallic design similar to the color tone of a chrome plating and the like that does not hinder the transmission of radio wave. The metallically gross layer decorative molded article includes a substrate comprised of a transparent resin layer, a tin and/or tin alloy layer provided on a back surface of the substrate, and a decorative paint layer provided on a back surface of the tin and/or tin alloy layer.

14 Claims, 2 Drawing Sheets

U.S. PATENT DOCUMENTS

| | | |
|---|---|---|
| 7,422,815 B2 | 9/2008 | Nakata et al. |
| 2002/0171579 A1 | 11/2002 | Artis et al. |
| 2004/0265602 A1* | 12/2004 | Kobayashi et al. .......... 428/458 |
| 2005/0031897 A1 | 2/2005 | Kamiya et al. |
| 2006/0216442 A1 | 9/2006 | Kamiya et al. |

FOREIGN PATENT DOCUMENTS

| | | |
|---|---|---|
| EP | 1 505 690 | 2/2005 |
| EP | 1 560 288 | 8/2005 |
| JP | 10-193549 | 7/1998 |
| JP | 2000-049522 | 2/2000 |
| JP | 2000-094575 | 4/2000 |
| JP | 2000-159039 | 6/2000 |
| JP | 2000-344032 | 12/2000 |
| JP | 2002-135030 | 5/2002 |
| JP | 2002-212324 | 7/2002 |
| JP | 2003-035766 | 2/2003 |
| JP | 2003-156555 | 5/2003 |
| JP | 2003-252136 | 9/2003 |
| JP | 2003-252137 | 9/2003 |
| JP | 2004-244516 | 9/2004 |
| JP | 2004-251866 | 9/2004 |
| JP | 2004-251868 | 9/2004 |
| JP | 2005-001193 | 1/2005 |
| JP | 2005-212745 | 8/2005 |
| JP | 2005-249773 | 9/2005 |
| JP | 2006-264593 | 10/2006 |

OTHER PUBLICATIONS

Office Action mailed from JPO on Jul. 8, 2008, in the Japanese Application No. 2005-088782.

Office Action for U. S. Appl. No. 11/387,846, mailed Oct. 7, 2008.

Office Action for Japanese patent application No. 2005-088284 issued Sep. 9, 2008.

* cited by examiner

METALLICALLY GROSS LAYER DECORATIVE MOLDED ARTICLE FOR USE IN THE BEAM PATH OF A RADAR DEVICE

BACKGROUND OF THE INVENTION

1. Field of the Invention

The invention relates to a metallically gross layer decorative molded article for protecting a radar device, particularly to a metallically gross layer decorative molded article placed in the beam path of a radar device installed behind the front grill of an automobile.

2. Background Art

Generally, the antennae for the transmission or reception of radio wave on communications equipment or radars, for example, are not much limited in terms of their design regarding the antenna body or its surrounding structures because of the priority placed on their functionality. For example, in the case of automobile antennae for the onboard radio, the bare rod antenna is used. However, it is sometimes desirable to hide the antenna, depending on its location. For example, in the case of a radar and the like for monitoring obstacles in front of the automobile or measuring its distance from the car in front, it is desirable to install the antenna at the center of the front of the car for optimum performance. In such cases, the antenna would have to be installed in the general area around the front grill of the car. In view of design considerations, however, the antenna should be invisible from the outside even in such cases.

In a technology called "auto cruise system," a sensor mounted at the front of the vehicle is used to measure the distance between one's own car and the car in front or the relative speed. Based on the thus acquired information, the throttles or brakes are controlled so as to accelerate or decelerate the vehicle and control the vehicle-to-vehicle distance. The auto cruise system is gaining attention as a corner stone of the so-called intelligent transport system (ITS) that aims to reduce traffic jams and accidents. The sensors used in the auto cruise system are generally provided by radio wave transmission/reception devices, such as millimeter wave radars.

FIG. 4 shows a radar device 100 mounted on an automobile, which device is usually installed behind a front grill 101. The front grill 101 mounts an emblem 102 of the manufacturer of the vehicle or other unique ornaments. The millimeter wave is emitted by the radar device toward the front via the front grill and the emblem, and the wave reflected by an object returns to the radar through the front grill and the emblem.

Therefore, the front grill, emblem, and other portions in the beam path of the radar device preferably employ materials and paints that have little wave transmission loss and provide a desired appearance.

The radio wave transmission/reception device is thus generally mounted behind the front grill of a vehicle. The front grill, however, is often plated with metal, which is a good electric conductor and does not allow for easy transmission of radio waves. The front grill is also provided with ventilation openings for the intake of air, resulting in uneven thicknesses. If radio waves are transmitted through such a front grill, differences are caused in the transmission rate of the wave between the thinner and thicker portions of the front grill, thereby making it difficult to obtain good radar sensitivity.

Under such circumstances, it is common practice to provide a window through which radio wave can pass at a location of the front grill that corresponds to the location of the radio wave transmission/reception device. By providing such a window in the front grill, radio wave can be transmitted and received through the window. However, the window breaks the sense of continuity in the exterior of the front grill. It could also allow the interior of the vehicle, such as the radio wave transmission/reception device or the engine room, to be viewed, thereby damaging the appearance of the vehicle.

In a conventional technology, to solve this problem, a radio wave transmitting cover as disclosed in JP Patent Publication (Kokai) No. 2000-159039 A is inserted in the window portion of the front grill so that a sense of unity can be established between the window and the front grill. The radio wave transmitting cover disclosed in JP Patent Publication (Kokai) No. 2000-159039 A is formed of a laminate of a plurality of resin layers formed with irregularities. Such a covering component, which has a metal layer with irregularities vapor-deposited between the resin layers, can provide the impression that the fins of the front grill are continuously existing in the radio wave transmitting cover.

As a metal that is vapor-deposited on the radio wave transmitting cover, indium is used. When indium is vapor-deposited on a deposited member, indium is deposited on the surface of the deposited member not in the form of a uniform film but of fine islands. Specifically, when indium is deposited on the deposited member, the surface of the deposited member is rendered into a state where a fine island-like indium deposited portion and a non-deposited portion finely exist together. In this case, radio wave can be transmitted through the non-deposited portion, and yet because of the fine island-like indium deposited portion, the surface of the deposited member is viewed as a member having a metallic luster.

However, indium is an expensive metal material and using it for deposition results in an increase in material cost. Furthermore, it is difficult to form the deposited portion and the non-deposited portion with desired proportions. For example, when the deposited portions are formed very close to one another, the entry and exit of radio wave could be hindered.

JP Patent Publication (Kokai) No. 2003-252137 A discloses a method for manufacturing a radio wave transmitting cover that is disposed on the front grill of a vehicle that has a lattice-like fin portion, wherein a radio wave transmission/reception device is installed behind the front grill. In this method, a metal covering film can be formed using various metal materials other than indium and excellent exit and entry of radio wave is ensured. The method comprises: a first step of forming a planar cover substrate; a second step of forming a metal thin film on one surface of the cover substrate, the metal thin film having a shape corresponding to that of the fins; a third step of forming an island-like metallically gross portion by physically or chemically removing a part of the metal thin film; and a fourth step of forming a transparent resin layer on the upper layer of the surface in which the metallically gross portion has been formed in the cover substrate.

JP Patent Publication (Kokai) Nos. 2000-159039 A and 2000-49522 A disclose that a plastic covered component located within the beam path of the radar device is deposited with a thin metal layer consisting of indium in an area of a metal-made portion that is visible from the outside. In this case, however, it is necessary to ensure the durability and reliability of the metallically gross design and the radio wave transmitting property by forming a stable protection layer on the indium metallically gross film layer, so that the indium metallically.

This is due to the following reasons, among others. For one thing, indium is a very soft metal material, with a Mohs hardness of 1.2. For another, because indium is basically a metal material, it corrodes in the aforementioned environment. Also because indium is basically a metal material, it produces a radio wave transmission loss in the form of conduction loss, which makes it necessary to ensure durability and reliability by reliably ensuring a film thickness such that the indium metallically gross-tone design can be obtained without increasing the thickness too much. And yet for another thing, the melting point of indium is very low at 156° C., such that the indium layer is melted by the heat of molten resin during the secondary formation of a lining resin following the formation of a resin molded article on the surface of the substrate in advance.

In this connection, JP Patent Publication (Kokai) No. 2000-344032 A discloses that a ceramic film comprised of a silicon dioxide is provided as a protection layer for protecting the indium film from peeling and ensuring the corrosion resistance thereof.

It is also noted that, in order to prevent the erroneous reception of radio wave by the radar device, the exterior component of the radar device that has a metallic luster needs to attenuate the radio intensity as little as possible. Namely, in order to prevent the attenuation of radio wave by the exterior component itself, the refraction and reflection of radio wave between the materials and by metal films need to be minimized.

SUMMARY OF THE INVENTION

A metallically gross layer decorative component having an indium deposited layer and a back surface painted in black according to a conventional technique is only capable of expressing a color tone that is far from the ideal color tone of the chrome plating. It is also incapable of exhibiting a variety of metallic color tones, such as gold. These are due to the fact that: (1) the deposited member is indium; and (2) the design painted color on the back surface is black.

In view of such problems, it is an object of the invention to provide a metallically gross layer decorative molded article to be used in a beam path of a radar device, the article having a luxury metallic design similar to the color tone of chrome plating, for example, without hindering the radio wave transmission of the device.

The aforementioned object of the invention is achieved by using a molded article of a specific structure having a specific metal layer as a metal deposition layer.

The invention provides a metallically gross layer decorative molded article for use in the beam path of a radar device that has either mode (1) or (2) as follows:

(1) It includes a substrate comprised of a transparent resin layer, a tin and/or tin alloy layer provided on a back surface of the substrate, and a decorative paint layer provided on a back surface of the tin and/or tin alloy layer.

(2) It includes a substrate comprised of a transparent resin layer, an undercoat layer (primer layer) provided on a back surface of the substrate, a tin and/or tin alloy layer provided on a back surface of the undercoat layer (primer layer), and a decorative paint layer provided on a back surface of the tin and/or tin alloy layer.

A preferable example of tin alloy is an alloy of tin (Sn) with one or more kinds of elements selected from indium (In), gallium (Ga), antimony (Sb), and bismuth (Bi).

The thickness of the tin and/or tin alloy layer is preferably 10 to 10000 Å and more preferably 50 to 5000 Å and most preferably 100 to 600 Å.

The method for the formation of the tin and/or tin alloy layer is not particularly limited. Specific examples include: vacuum thin-film formation methods such as vacuum deposition, ion plating, and sputtering; vapor-phase growth methods such as thermal CVD, plasma CVD, optical CVD, and MOCVD; LB (Langmuir-Blodgett) method; electroless deposition method; and sol-gel method. Of these methods, the vacuum deposition methods or the sputtering methods are preferable.

In the metallically gross layer decorative molded article of the invention, the transparent resin layer that forms the substrate is comprised of preferably one or more kinds selected from a polycarbonate resin layer, an acrylic resin layer, and a cyclic polyolefin resin layer.

In the metallically gross layer decorative molded article of the invention, the decorative paint layer is preferably comprised of a urethane resin layer and/or an acrylic resin layer.

Preferably, the thickness of the decorative paint layer is 10 to 30 µm.

In accordance with the invention, an undercoat layer may be provided between the substrate comprised of a transparent resin layer and the tin and/or tin alloy layer. The undercoat layer, which is a primer layer for enhancing adhesion, may be either transparent or colored.

The invention also provides an automobile having the aforementioned metallically gross layer decorative molded article installed in the beam path of a radar device as a mecallically gross layer decorative component.

In accordance with the invention, wherein a tin and/or tin alloy layer is provided on a back surface of the substrate, a metallically gross layer decorative molded article for use in the beam path of a radar device can be provided that has a luxurious metallic design similar to the color tone of chrome-plating and that does not hinder the transmission of radio wave.

DESCRIPTION OF PREFERRED EMBODIMENTS

Figure 1:
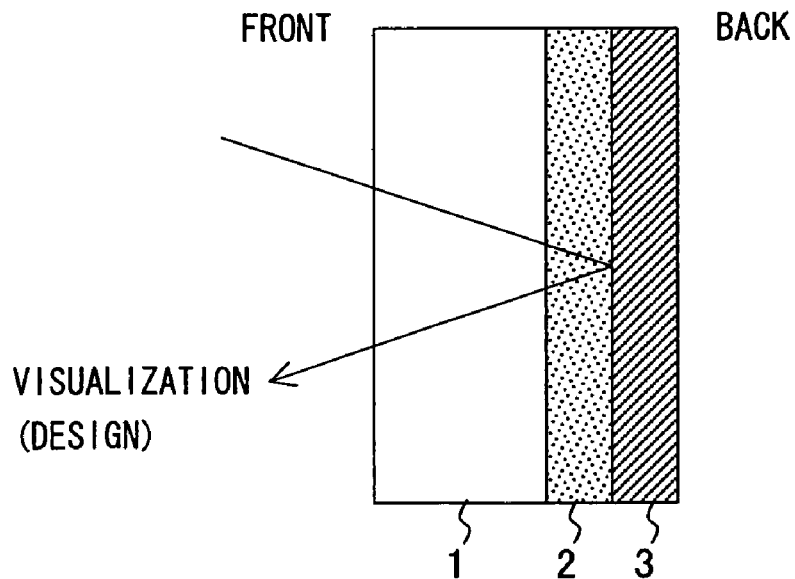
FIG. 1 shows an example of the cross-sectional structure of a metallically gross layer decorative molded article for use in the beam path of a radar device according to the invention.

FIG. 1 shows an example of the cross-sectional structure of a metallically gross layer decorative molded article for use in the beam path of a radar device according to the invention. The metallically gross layer decorative molded article is comprised of, from the front surface to the back thereof, a transparent resin layer 1 as a substrate, a tin and/or tin alloy layer 2 provided on the back surface of the substrate, and a decorative paint layer 3 provided on the back surface of the tin and/or tin alloy layer. When viewed from the front surface, natural light that is incident on the metallically gross layer decorative molded article is transmitted by the transparent resin layer 1 and the tin and/or tin alloy layer 2 and then reflected by the decorative paint layer 3. The decorative paint layer 3 enhances the color tone of the tin and/or tin alloy layer 2 to a luxurious color tone, such as a chrome color.

Figure 2:
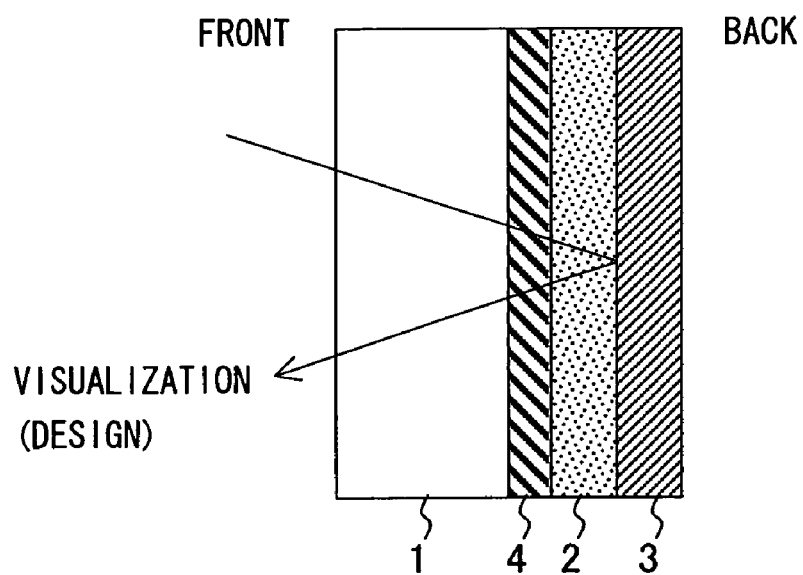
FIG. 2 shows another example of the cross-sectional structure of a metallically gross layer decorative molded article for use in the beam path of a radar device according to the invention.
Figure 3:
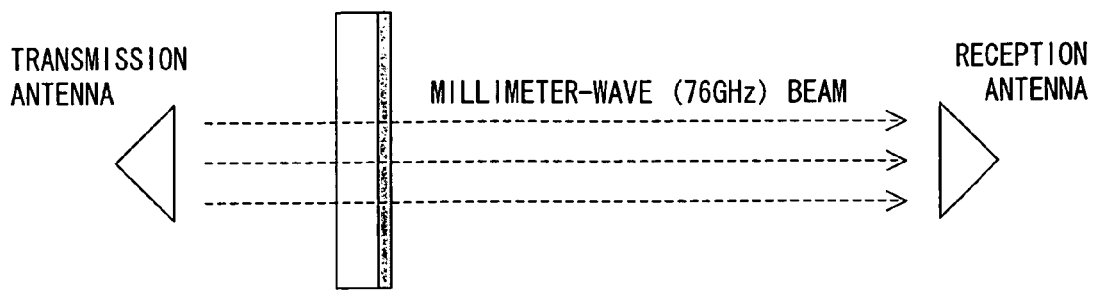
FIG. 3 is a drawing for the explanation of a radio property testing method.

FIG. 2 shows another example of the cross-sectional structure of the molded article for use in the beam path of the radar device according to the invention. The metallically gross layer decorative molded article is comprised of, from the surface thereof sequentially, a transparent resin layer 1 as a substrate, an undercoat layer 4 (primer layer) for enhancing the adhesion between the transparent resin layer 1 and the tin and/or tin alloy layer 2, a tin and/or tin alloy layer 2, and a decorative paint layer 3 provided on the back surface of the tin and/or tin alloy layer. As in FIG. 1, natural light incident on the metallically gross layer decorative molded article is transmitted by the transparent resin layer 1, undercoat layer 4 and the tin and/or tin alloy layer 2, and then reflected by the decorative paint layer 3.

In FIGS. 1 and 2, by selecting the material and the thickness of the tin and/or tin alloy layer 2, any desired color can be exhibited. Also, by forming the tin and/or tin alloy layer 2 in a multilayered structure, a metallic exterior with rainbow-colored interference colors can be obtained.

The transparent resin layer 1 is comprised of a material that has a small radio wave transmission loss and an excellent dielectric characteristic. The dielectric characteristic is measured in terms of relative dielectric constant $\epsilon'$ and dielectric loss tan $\delta$, for example, as indices. Preferably, the transparent resin layer 1 is made of polycarbonate resin, acrylic resin, or cyclic polyolefin resin.

Because cyclic polyolefin resin, which is one of the transparent resins used as a substrate in the invention and whose examples include polynorbornene resin and polycyclohexane resin, is amorphous, it has excellent transparency.

When cyclic polyolefin resin, with its small radio wave transmission loss and excellent dielectric property, is used in the transparent resin layer 1, the wettability of the substrate surface can be improved and its adhesion with the tin and/or tin alloy layer can be significantly improved by treating the substrate surface of the cyclic polyolefin resin layer with plasma etching and/or high-concentration ozone water.

To the transparent resin used as the substrate in the invention, there can be added other polymers as needed, such as rubber or other thermoplastic resin, for example. Examples of the rubber include thermoplastic elastomers such as natural rubber, polybutadiene rubber, polyisoprene rubber, acrylonitrile-butadiene copolymer rubber, styrene-butadiene copolymer rubber, styrene-isoprene copolymer rubber, styrene-butadiene-isoprene copolymer rubber, hydrogen-added diene-series rubber, saturated polyolefin rubber such as ethylene-α-olefin copolymer such as ethylene-propylene copolymer, ethylene-propylene-diene copolymer, α-olefin-diene copolymer, urethane rubber, silicone rubber, polyether rubber, acrylic rubber, styrene-butadiene-styrene block copolymer rubber, and styrene-isoprene-styrene block copolymer rubber, hydrogen-added thermoplastic elastomer, urethane thermoplastic elastomer, polyamide thermoplastic elastomer, and 1,2-polybutadiene thermoplastic elastomer.

Examples of the other thermoplastic resin include polyolefins such as low-density polyethylene, high-density polyethylene, LLDPE, very low-density polyethylene, polypropylene, syndiotactic polypropylene, polybutene, and polypentene, polyesters such as polyethylene terephthalate and polybutylene terephthalate, polyamides such as nylon 6 and nylon 66, ethylene ethylacrylate copolymer, ethylene vinyl acetate copolymer, polystyrene, syndiotactic polystyrene, polyphenylene sulfide, polyphenylene ether, aromatic polyamide, and polycarbonate. These other thermoplastic resins may be used individually or in combination of two or more kinds, and their amounts added are such that the radio wave transmission property, durability, and abrasion resistance of the transparent resin are not lost. Specifically, their amounts are 50% by mass or less and preferably 30% by mass or less with respect to the transparent resin.

An additive may be added to the transparent resin as needed. Examples of the additive include antioxidant, ultraviolet absorber, lubricant, antifogging agent, anti-misting agent, plasticizer, colorant, near-infrared absorbing agent, and antistatic agent.

A molded article of transparent resin can be manufactured by any of conventional methods, such as the melt molding method and the casting method. Examples of the melt molding method include melt extrusion methods such as T-die molding and inflation molding, calender method, heat-pressing method, and injection molding method. In the casting method, a liquid member with individual components dissolved or dispersed in a solvent is flow-cast on a support, and then the solvent is dried. Examples of the solvent used include aromatic hydrocarbons such as toluene, xylene, mesitylene, alicyclic hydrocarbons such as cyclohexane and decalin, and halogen compounds such as methylene chloride, chloroform, chlorobenzene, and dichlorobenzene. The concentration of the transparent resin in the liquid is normally 0.1 to 60% by mass and preferably 3 to 45% by mass. Methods for flow-casting the liquid on the support include those involving a bar coater, a doctor blade, a wire bar, a roll coater, a die coater, spraying, air-knife coating, spin coating, and dip coating. Drying and removal of the solvent is carried out in a usual manner such that the content of the remaining solvent is 5% by mass or less and preferably 1% by mass or less, and more preferably 0.5% by mass or less.

EXAMPLE

In the following, examples of the invention and a comparative example are described.

Examples 1 to 3, and Comparative Example 1

Planar test pieces measuring 150×150 mm with a thickness of 5.5 mm were prepared from polycarbonate resin, and were then deposited with tin. The examples were compared with a test piece (Comparative Example 1) comprised of a polycarbonate-formed film substrate deposited with indium in terms of visual exterior (design) of the surface and the millimeter wave transmission loss.

Figure 4:
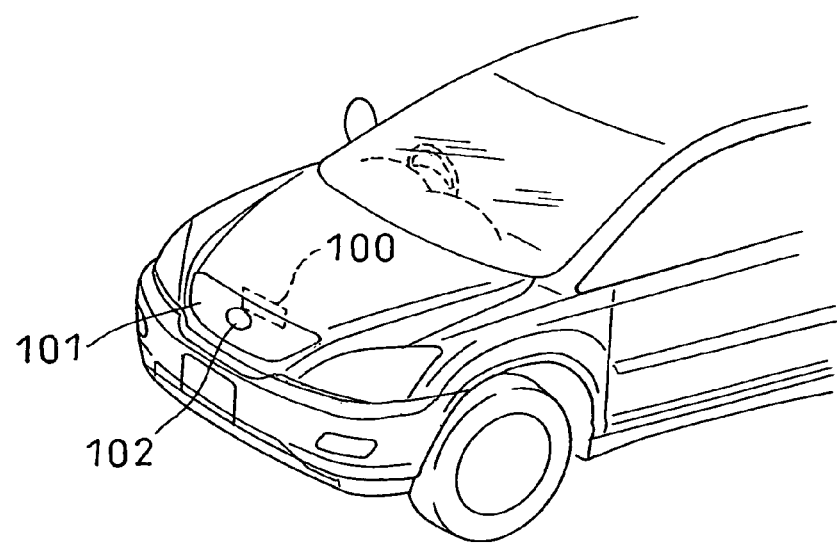
FIG. 4 shows a concept of an automobile equipped with a radar device.

The radio wave transmission loss (roundtrip) was measured by a predetermined method at 76 GHz, which is the frequency used by vehicle-mounted millimeter-wave radars with radio wave transmission loss, as shown in FIG. 4. Results of the performance comparison are shown in Table 1.

TABLE 1

| | Transparent resin layer | Metal deposited layer | Decorative paint layer | Design | Millimeter-wave transmission loss (dB) (roundtrip) |
|---|---|---|---|---|---|
| Ex. 1 | Polycarbonate resin, thickness 5.5 mm | Tin, thickness 300Å | Painted in gray, thickness 30 μm | Chrome-plated tone | 1.6-1.8 |

TABLE 1-continued

|  | Transparent resin layer | Metal deposited layer | Decorative paint layer | Design | Millimeter-wave transmission loss (dB) (roundtrip) |
|---|---|---|---|---|---|
| Ex. 2 | Polycarbonate resin, thickness 5.5 mm | Tin, thickness 300Å | Painted in white, thickness 30 μm | Chrome-plated tone with yellowish tint | 1.6-1.8 |
| Ex. 3 | Polycarbonate resin, thickness 5.5 mm | Tin, thickness 300Å | Painted in black, thickness 30 μm | Chrome-plated tone with bluish tint | 1.6-1.8 |
| Comp. Ex. 1 | Polycarbonate resin, thickness 5.5 mm | Indium, thickness 300Å | Painted in black, thickness 30 μm | Blackish chrome-plated tone | 1.7-1.8 |

The results shown in Table 1 indicate that in the Examples 1 to 3 according to the invention, in which tin is used in the metal deposited layer, a luxurious chrome-plated tone or a chrome-plated tone with different tints can be obtained that do not hinder the radar function. On the other hand, their performance in terms of the millimeter-wave transmission loss (roundtrip) in the 76 GHz band is comparable to that of Comparative Example 1 with its indium deposited layer.

What is claimed is:

1. A metallically gross layer decorative molded article for use in the beam path of a radar device, said article comprising:
    a substrate comprised of a transparent resin layer;
    a tin and/or tin alloy layer provided on a back surface of said substrate; and
    a decorative gray, white or black paint layer provided on a back surface of said tin and/or tin alloy layer, wherein said decorative gray, white or black paint layer comprises a urethane resin layer and/or an acrylic resin layer.

2. The metallically gross layer decorative molded article for use in the beam path of a radar device according to claim 1, wherein said tin alloy is an alloy of tin (Sn) with one or more elements selected from indium (In), gallium (Ga), antimony (Sb), and bismuth (Bi).

3. The metallically gross layer decorative molded article for use in the beam path of a radar device according to claim 1, wherein said tin and/or tin alloy layer has a thickness of 100 to 600 Å.

4. The metallically gross layer decorative molded article for use in the beam path of a radar device according to claim 1, wherein said tin and/or tin alloy layer is formed by vacuum deposition or sputtering.

5. The metallically gross layer decorative molded article for use in the beam path of a radar device according to claim 1 wherein said transparent resin layer comprises one or more layers selected from a polycarbonate resin layer, an acrylic resin layer, and a cyclic polyolefin resin layer.

6. The metallically gross layer decorative molded article for use in the beam path of a radar device according to claim 1, wherein said decorative paint layer has a thickness of 10 to 30 μm.

7. An automobile having the metallically gross layer decorative molded article for use in the beam path of a radar device according to claim 1, wherein said metallically gross layer decorative molded article is installed in the beam path of a radar device as a metallically gross layer decorative component.

8. A metallically gross layer decorative molded article for use in the beam path of a radar device, said article comprising:
    a substrate comprised of a transparent resin layer;
    an undercoat layer (primer layer) provided on a back surface of said substrate;
    a tin and/or tin alloy layer provided on a back surface of said undercoat layer (primer layer); and
    a decorative gray, white or black paint layer provided on a back surface of said tin and/or tin alloy layer, wherein said decorative gray, white or black paint layer comprises a urethane resin layer and/or an acrylic resin layer.

9. The metallically gross layer decorative molded article for use in the beam path of a radar device according to claim 8, wherein said tin alloy is an alloy of tin (Sn) with one or more elements selected from indium (In), gallium (Ga), antimony (Sb), and bismuth (Bi).

10. The metallically gross layer decorative molded article for use in the beam path of a radar device according to claim 8, wherein said tin and/or tin alloy layer has a thickness of 100 to 600 Å.

11. The metallically gross layer decorative molded article for use in the beam path of a radar device according to claim 8, wherein said tin and/or tin alloy layer is formed by vacuum deposition or sputtering.

12. The metallically gross layer decorative molded article for use in the beam path of a radar device according to claim 8, wherein said transparent resin layer comprises one or more layers selected from a polycarbonate resin layer, an acrylic resin layer, and a cyclic polyolefin resin layer.

13. The metallically gross layer decorative molded article for use in the beam path of a radar device according to claim 8, wherein said decorative paint layer has a thickness of 10 to 30 μm.

14. An automobile having the metallically gross layer decorative molded article for use in the beam path of a radar device according to claim 8, wherein said metallically gross layer decorative molded article is installed in the beam path of a radar device as a metallically gross layer decorative component.

* * * * *